(12) United States Patent
Kanno et al.

(10) Patent No.: US 8,742,626 B2
(45) Date of Patent: Jun. 3, 2014

(54) WIRELESS POWER TRANSMISSION SYSTEM

(75) Inventors: Hiroshi Kanno, Osaka (JP); Hiroshi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 564 days.

(21) Appl. No.: 13/081,083

(22) Filed: Apr. 6, 2011

(65) Prior Publication Data

US 2011/0248573 A1    Oct. 13, 2011

Related U.S. Application Data

(60) Provisional application No. 61/321,541, filed on Apr. 7, 2010.

(51) Int. Cl.
*H01F 27/42* (2006.01)

(52) U.S. Cl.
USPC .......................................... 307/104

(58) Field of Classification Search
USPC .......................................... 307/104
See application file for complete search history.

(56) References Cited

U.S. PATENT DOCUMENTS

| | | | |
|---|---|---|---|
| 5,808,587 A | 9/1998 | Shima | |
| 2008/0278264 A1 | 11/2008 | Karalist et al. | |
| 2009/0102419 A1 | 4/2009 | Gwon et al. | |
| 2012/0262004 A1* | 10/2012 | Cook et al. | 307/104 |
| 2012/0280765 A1* | 11/2012 | Kurs et al. | 333/175 |

FOREIGN PATENT DOCUMENTS

| | | |
|---|---|---|
| JP | 03-218611 A | 9/1991 |
| JP | 3-124618 U | 12/1991 |
| JP | 07-263935 A | 10/1995 |
| JP | 2008-104319 A | 5/2008 |
| JP | 2009-504115 T | 1/2009 |
| JP | 2009-124878 A | 6/2009 |
| JP | 2009-188131 A | 8/2009 |
| JP | 2010-073976 A | 4/2010 |
| WO | 2007/008646 A2 | 1/2007 |

OTHER PUBLICATIONS

International Search Report for corresponding International Application No. PCT/JP2011/002041 mailed Jul. 19, 2011.
Form PCT/ISA/237 for International Application No. PCT/JP2011/002041 dated Jul. 19, 2011.

* cited by examiner

*Primary Examiner* — Robert L. Deberadinis
(74) *Attorney, Agent, or Firm* — Renner, Otto, Boisselle & Sklar, LLP

(57) ABSTRACT

A wireless power transmission system is designed to transmit power between a power-transmitting resonator 105 and a power-receiving resonator 107, which are implemented as inductors LL and Ls of mutually different sizes, by a non-contact method over a resonant magnetic field with a resonant frequency f0. When measured at the resonant frequency f0, the resistance value Rs per unit length of at least a part of wiring that forms the smaller inductor Ls is lower than that (RL) of wiring that forms the other larger inductor LL. In this manner, high transmission efficiency can be maintained between those power-transmitting and power-receiving resonators without increasing the overall length of wiring used wastefully.

11 Claims, 5 Drawing Sheets

(a)

(b)

(c)

(a)

(b)

(c)

WIRELESS POWER TRANSMISSION SYSTEM

This application claims priority under 35 USC §119(e) to U.S. Provisional Application No. 61/321,541 filed on Apr. 7, 2010, the entire contents of which are incorporated herein by reference.

BACKGROUND OF THE INVENTION

1. Field of the Invention

The present invention relates to a wireless power transmission system for transferring energy by a non-contact method in order to charge a device or system for example with electric power or supply or collect electric power to/from such a device or system.

2. Description of the Related Art

Non-contact wireless energy transfer technologies have attracted increasing attention these days in order to increase the mobility and water resistance of various electronic devices as much as possible, realize a wireless wall-mounted TV monitor, and charge and supply power to a big object such as an electric car.

As a novel non-contact power transmission method that would replace the conventional one that uses electromagnetic induction, a resonant magnetic coupling method has been proposed in United States Patent Application Laid-Open Publication No. 2008/0278264-A1, for example (see FIGS. 6 and 11). According to such a method, resonant mode coupling between resonant antennas is used to realize longer range and higher efficiency power transmission than the conventional electromagnetic induction method. It is thought that particularly if a resonant magnetic field is used, influence on surrounding organisms would be reduced compared to a situation where a resonant electric field is used.

The resonant magnetic coupling method will be described in further detail. As disclosed in Paragraph #0033 of the description of United States Patent Application Laid-Open Publication No. 2008/0278264, the self-resonance phenomenon, which is unique to a loop coil with two open ends, may be used to form a resonator. Alternatively, as disclosed in Paragraph #0038 of that US patent application, the resonator may also be formed as a coil loaded with a capacitor.

On the other hand, Japanese Patent Application Laid-Open Publication No. 2008-104319 (see Paragraph #0006, in particular) discloses an example in which a multi-core wire such as a Litz wire or a braided wire is used to form the wiring portion of a power-transmitting or power-receiving coil in order to reduce the quantity of heat generated by a large amount of current that flows through the coil.

Furthermore, Japanese Patent Application Laid-Open Publication No. 7-263935 (see FIG. 3, in particular) proposes that multiple turns be connected in parallel with each other in order to increase the Q factor of an antenna (or coil) for use in non-contact power transmission without increasing its size too much.

In the conventional wireless power transmission system of the resonant magnetic coupling type, if the sizes of its power-transmitting resonator and power-receiving resonator are significantly different from each other, it is difficult to maintain high transmission efficiency. But to avoid such difficulty, the overall length of wiring used should be increased considerably.

It is therefore an object of the present invention to provide a wireless power transmission system that can maintain high transmission efficiency without wastefully increasing the overall length of wiring used even if the sizes of its power-transmitting and power-receiving resonators are significantly different from each other.

SUMMARY OF THE INVENTION

A wireless power transmission system according to the present invention is designed to transmit power by a non-contact method over a resonant magnetic field with a resonant frequency f0. The system includes a power-transmitting resonator and a power-receiving resonator. One of the power-transmitting and power-receiving resonators includes a first inductor of a first size and the other resonator includes a second inductor of a second size that is smaller than the first size. At the resonant frequency f0, at least a part of wiring that forms the second inductor has a resistance value Rs per unit length that is lower than the resistance value RL per unit length of wiring that forms the first inductor.

In one preferred embodiment, the wiring that forms the second inductor has a parallel wiring structure, and at least part of the wiring that forms the second inductor has a greater number of parallel wires than the wiring that forms the first inductor.

In another preferred embodiment, the wirings that form the first and second inductors both have a parallel wiring structure, and at least part of the wiring that forms the second inductor has a greater number of parallel wires than the wiring that forms the first inductor.

In still another preferred embodiment, a part of the second inductor includes wires, of which at least one of the diameter, thickness and height is greater than their counterparts of the wiring that forms the first inductor.

In yet another preferred embodiment, except for an outermost part, the wiring that forms the second inductor has a lower resistance value Rs than the resistance value RL.

In this particular preferred embodiment, at least with respect to an innermost part, the wiring that forms the second inductor has a lower resistance value Rs than the resistance value RL.

In yet another preferred embodiment, the wireless power transmission system further includes a power transmitter for supplying power to the power-transmitting resonator, and the optimum input impedance of the power-transmitting resonator that maximizes transmission efficiency between the power-transmitting and power-receiving resonators is matched to the output impedance of the power transmitter.

In yet another preferred embodiment, the wireless power transmission system further includes a power receiver for receiving power from the power-receiving resonator, and the optimum output impedance of the power-receiving resonator that maximizes transmission efficiency between the power-transmitting and power-receiving resonators is matched to the input impedance of the power receiver.

In this particular preferred embodiment, the output impedance of the power receiver is matched to a load impedance.

According to the present invention, even if the power-transmitting and power-receiving resonators have significantly different sizes, a wireless power transmission system that can maintain high transmission efficiency without increasing wastefully the overall length of wiring is provided. Thus, the present invention provides a lightweight wireless power transmission system that can save valuable natural resources and that will require a much smaller space on the chip at a considerably reduced cost.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
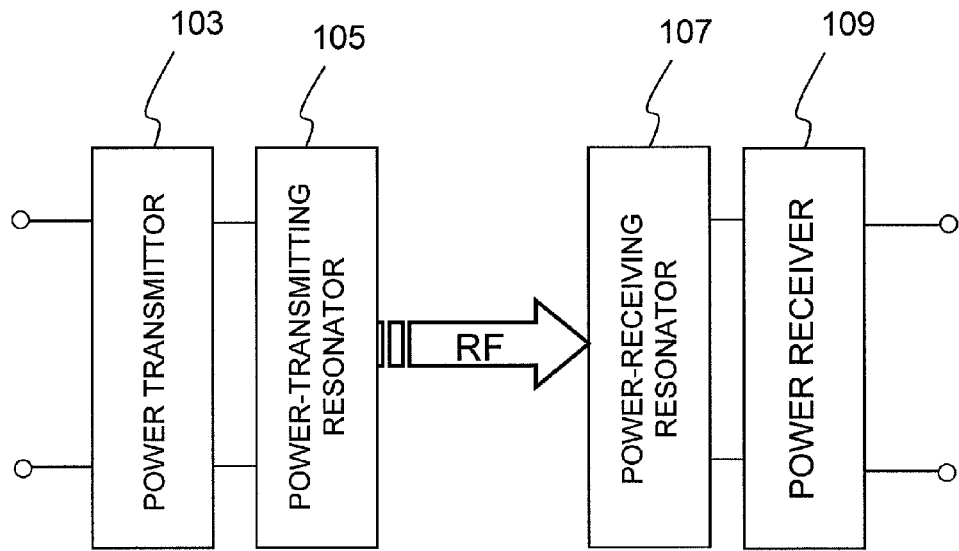
FIG. 1 is a block diagram illustrating a wireless power transmission system as a first specific preferred embodiment of the present invention.

Hereinafter, preferred embodiments of a wireless power transmission system according to the present invention will be described with reference to the accompanying drawings. In the XYZ coordinate system illustrated in some of the drawings, the plane on which an inductor that is one of the components that form the power-transmitting resonator or power-receiving resonator is arranged is supposed to be the XY plane and the height direction of the inductor is supposed to be the Z direction. In the following description, any pair of components shown in multiple drawings and having substantially the same function will be identified by the same reference numeral.

Embodiment 1

FIG. 1 is a block diagram illustrating a configuration for a wireless power transmission system as a first specific preferred embodiment of the present invention.

As shown in FIG. 1, the wireless power transmission system of this preferred embodiment includes a power-transmitting resonator 105 and a power-receiving resonator 107 and transmits power by a non-contact method between the power-transmitting resonator 105 and the power-receiving resonator 107 over a resonant magnetic field. This wireless power transmission system is designed so that the power-transmitting resonator 105 and the power-receiving resonator 107 set up resonances at a frequency f0.

A power transmitter 103 is connected to the power-transmitting resonator 105. The power transmitter 103 receives DC or AC energy (electric energy) from a power supply (not shown) and transforms the energy into RF energy with the frequency f0. The RF energy is sent out from the power transmitter 103 to the power-transmitting resonator 105. The power-transmitting resonator 105 and the power-receiving resonator 107, which are designed so as to produce resonances at the same frequency, are coupled together with a resonant magnetic field (with a resonant frequency f0). That is why the power-receiving resonator 107 can receive efficiently the RF energy that has been sent out by the power-transmitting resonator 105. As wireless power transmission is done using such a resonant magnetic field that oscillates at the resonant frequency f0, the resonant frequency f0 will sometimes be referred to herein as "transmission frequency".

Figure 2:
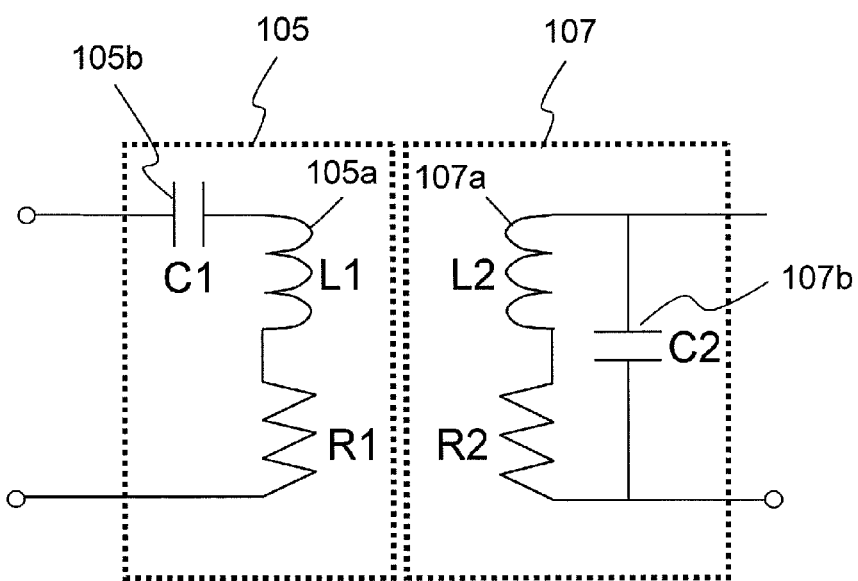
FIG. 2 illustrates a power-transmitting resonator and a power-receiving resonator according to the first preferred embodiment of the present invention.

Next, reference is made to FIG. 2 which illustrates an equivalent circuit for the power-transmitting resonator 105 and power-receiving resonator 107. In the example illustrated in FIG. 2, the power-transmitting resonator 105 is a series resonant circuit in which an inductor 105a and a capacitor 105b are connected together in series, while the power-receiving resonator 107 is a parallel resonant circuit in which an inductor 107a and a capacitor 107b are connected in parallel with each other. The series resonant circuit of the power-transmitting resonator 105 has a resistance component R1 and the parallel resonant circuit of the power-receiving resonator 107 has a resistance component R2.

In the example illustrated in FIG. 2, the power-transmitting resonator 105 is implemented as a series resonant circuit and the power-receiving resonator 109 is implemented as a parallel resonant circuit. However, the present invention is in no way limited to this specific example. Rather, either one, or even both, of the power-transmitting and power-receiving resonators 105 and 107 may be series resonant circuit(s). Alternatively, it is also possible to adopt a circuit configuration in which the resonators are DC isolated from an external circuit and are supplied with RF energy by the external circuit through an electromagnetic induction coil (not shown). In that case, both ends of the wires that form the resonators may be either opened. Or a closed loop may also be formed with capacitors interposed. In any case, the self-resonant frequency is set to be as high as the transmission frequency.

Hereinafter, a configuration for the power-transmitting resonator 105 and the power-receiving resonator 107 will be described in detail with reference to FIG. 3, which is a perspective view illustrating an exemplary configuration for the power-transmitting resonator 105 and the power-receiving resonator 107 of this preferred embodiment.

According to the present invention, one of the power-transmitting and power-receiving resonators 105 and 107 has a first inductor LL of a first size, while the other resonator has a second inductor Ls of a second size, which is smaller than the first size. In this description, "size" of an inductor means an area of a region enclosed by the wiring of the inductor. Power is transmitted between the power-transmitting resonator 105 and the power-receiving resonator 107 with the ability to carry out bidirectional communications between them. In the following example, the inductor LL of the relatively large size (the "larger inductor") is supposed to be that of the power-transmitting resonator 105 (which will be referred to herein as a "power-transmitting inductor"). On the other hand, the inductor Ls of the relatively small size (the "smaller inductor") is supposed to be that of the power-receiving resonator 107 (which will be referred to herein as a "power-receiving inductor") for the sake of simplicity.

The configurations of these inductors will be described in detail.

According to this preferred embodiment, the power-transmitting resonator 105 is a series resonant circuit consisting of a power-transmitting inductor LL and a power-transmitting capacitor CL, while the power-receiving resonator 107 is a series resonant circuit consisting of a power-receiving inductor Ls and a power-receiving capacitor Cs. The resistance per unit length of the wiring that forms the power-transmitting inductor LL at a frequency f0 will be referred to herein as "resistance RL". And the resistance per unit length of the wiring that forms the power-receiving inductor Ls at the frequency f0 will be referred to herein as "resistance Rs". According to this preferred embodiment, the resistance value Rs of at least a part of the wiring that forms the power-receiving inductor Ls is set to be lower than that (RL) of at least a part of the wiring that forms the power-transmitting inductor LL. Typically, the wiring that forms the power-transmitting inductor LL has a constant resistance value RL everywhere. Nevertheless, only a part of that wiring that forms the power-transmitting inductor LL may have a lower resistance value RL than the rest of the wiring.

Each of the inductors LL and Ls is spiral inductor and may be either a series connection of multiple wires that have mutually different resistance values per unit length at the wireless power transmission frequency f0 or a wiring structure with a constant resistance value. FIG. 3 also illustrates cross-sectional structures for inductors that have a parallel arrangement of multiple conductor wires (or fine wires) 20.

To make a particular part of the wiring that forms the inductor have a lower resistance value per unit length (such a part will be referred to herein as a "low-resistance part") than the rest of the wiring, it is effective to either make that particular part of a wiring material with high conductivity, or to adopt a parallel wiring structure in which that particular part has a larger number of wires than the other part of the wiring. Also, it is also effective to plate that particular part of wiring with a metal with high conductivity to prevent the surface of the wiring from getting oxidized. If the parallel wiring structure is adopted, it is more preferred that those wires that are arranged in parallel with each other be twisted together.

Figure 3:
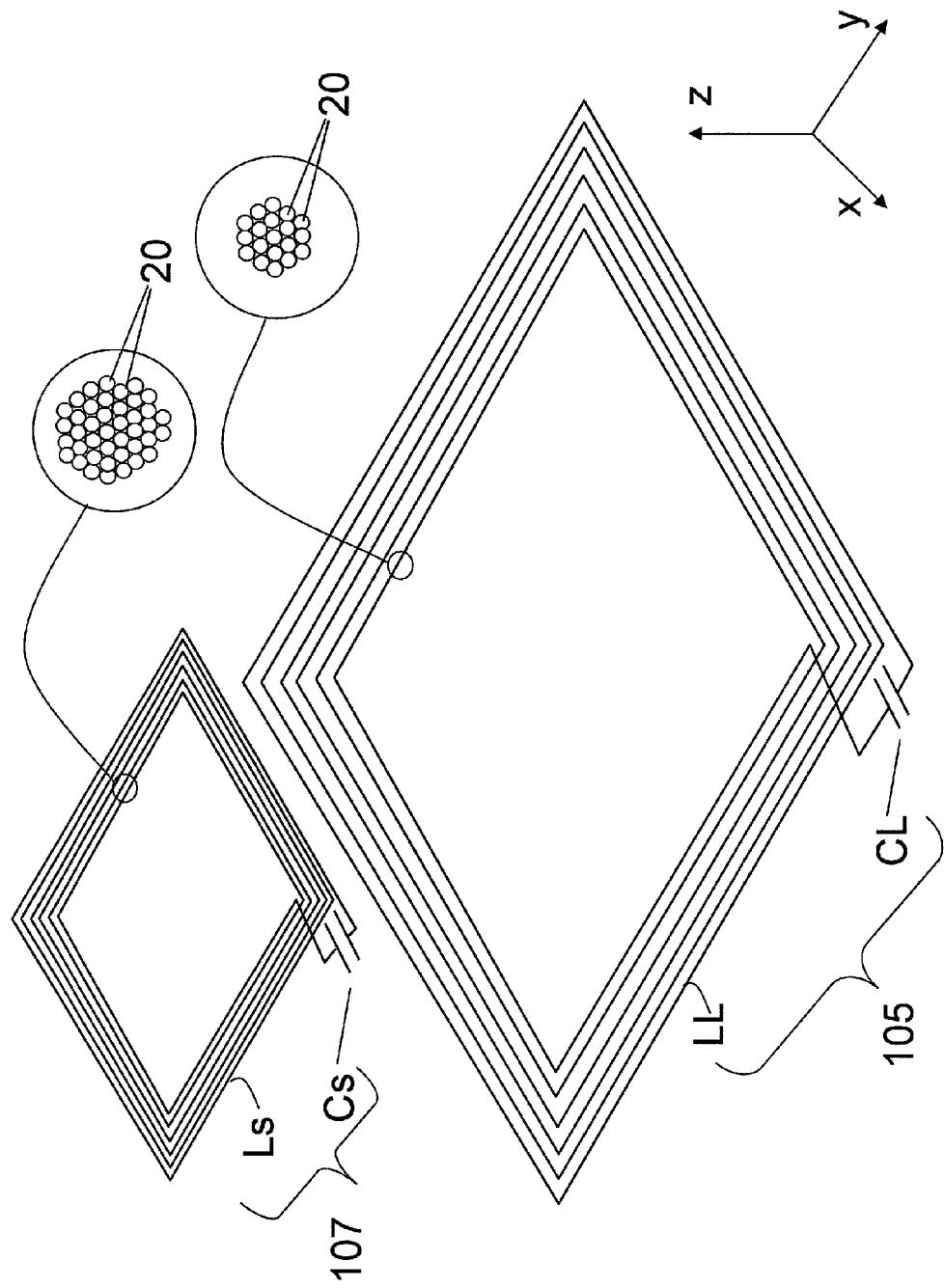
FIG. 3 is a schematic perspective view of a wireless power transmission system according to the first preferred embodiment of the present invention.
Figure 4:
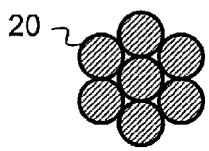
FIGS. 4(a), 4(b) and 4(c) are cross-sectional views of exemplary parallel wiring structures as viewed perpendicularly to the longitudinal direction thereof.
Figure 4:
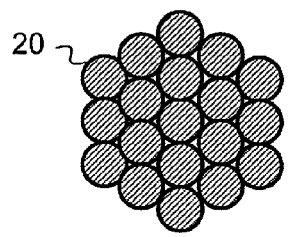
Figure 4:
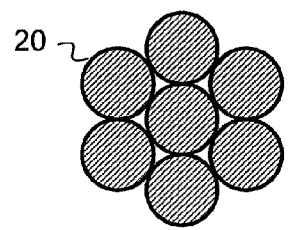

FIGS. 4(a) through 4(c) are cross-sectional views illustrating examples of the parallel wiring structure. Specifically, FIG. 4(a) illustrates an exemplary cross section of a wiring structure with a relatively high resistance value, while FIG. 4(b) illustrates an exemplary cross section of the low-resistance part of the inductor wiring. In the low-resistance part, a greater number of fine wires 20 are arranged in parallel with each other than the other wiring part. If both of the smaller power-receiving inductor Ls and the larger power-transmitting inductor LL have a parallel wiring structure as in the example illustrated in FIG. 3, then the number of parallel fine wires that form at least a portion of the wiring of the power-receiving inductor Ls only needs to be larger than the number of parallel fine wires that form the wiring of the power-transmitting inductor LL. It should be noted that not both of these inductors LL and Ls have to have the parallel wiring structure.

Alternatively, the low-resistance part of the inductor wiring may also have fine wires 20 with a greater diameter than the other portion (represented in FIG. 4(a)) of the inductor wiring without changing the number of fine wires 20 that are arranged in parallel with each other as represented in FIG. 4(c).

Figure 5:
FIGS. 5(a), 5(b) and 5(c) are cross-sectional views of alternative parallel wiring structures as viewed perpendicularly to the longitudinal direction thereof.
Figure 5:
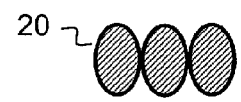
Figure 5:

FIG. 5 illustrates other exemplary cross sections of the inductors. Specifically, FIG. 5(a) illustrates an exemplary cross section of the wiring with a relatively high resistance value, while FIGS. 5(b) and 5(c) illustrate exemplary cross sections of the low-resistance part. In the low-resistance part shown in FIG. 5(b), the fine wires 20 are made thicker than elsewhere without changing the number of the fine wires 20 that are arranged in parallel with each other. On the other hand, in the low-resistance part shown in FIG. 5(c), the fine wires 20 are made wider than elsewhere without changing the number of the fine wires 20 that are arranged in parallel with each other. In any case, in the low-resistance part, at least one fine wire needs to have a greater diameter, thickness or width than elsewhere.

Now look at FIG. 3 again. The capacitors CL and Cs to be connected to the inductors LL and Ls are set up so that the resonant frequency of the resonators 105 and 107 becomes as high as the electromagnetic energy transmission frequency f0.

The transmission efficiency of a wireless power transmission system heavily depends on the loss caused by the inductors of transmission system. To reduce the loss that would be caused by an inductor, it is preferred that the wiring of the inductor have a parallel conductor structure and a reduced resistance value per unit length. If the power-transmitting and power-receiving inductors have mutually different sizes as shown in FIG. 3, however, it is not practical to attempt to reduce the wiring resistance over the entire wiring path of the power-transmitting resonator 105 that would cover a broader area in order to cut down the conductor loss because such a measure would pose an obstacle to reducing the overall weight and cost of the wiring.

To overcome such problem, the present invention provides a practical and effective method for improving the transmission efficiency of a wireless power transmission system, of which the power-transmitting and power-receiving inductors have mutually different sizes. More specifically, for that purpose, the loss to be caused by the smaller inductor Ls that would have particularly significant influence on transmission efficiency is cut down preferentially. Specifically, as the smaller inductor Ls generates a magnetic field with a higher density around it than the larger inductor LL does, the eddy current produced by the wires causes more loss in the smaller inductor Ls. That is why the more preferentially such influence is reduced, the more dramatically the efficiency will be improved when power is transmitted between power-transmitting and power-receiving resonators with mutually different sizes. Also, a wasteful increase in overall wiring length can be avoided by lowering the resistance value of the smaller inductor Ls rather than by lowering that of the larger inductor LL. For these reasons, by adopting the arrangement of the present invention, the transmission efficiency can be improved while avoiding an increase in overall wiring length.

Effect to be Achieved by Reducing Wiring Resistance Partially

However, when the wiring resistance value of the inductor Ls is reduced in the wireless power transmission system of the present invention in order to improve the transmission efficiency, there is no need to reduce the wiring resistance over the entire wiring path of the inductor Ls. Rather, the effect of the present invention can also be achieved by reducing the wiring resistance in just a part of the wiring path of the inductor Ls.

Figure 6:
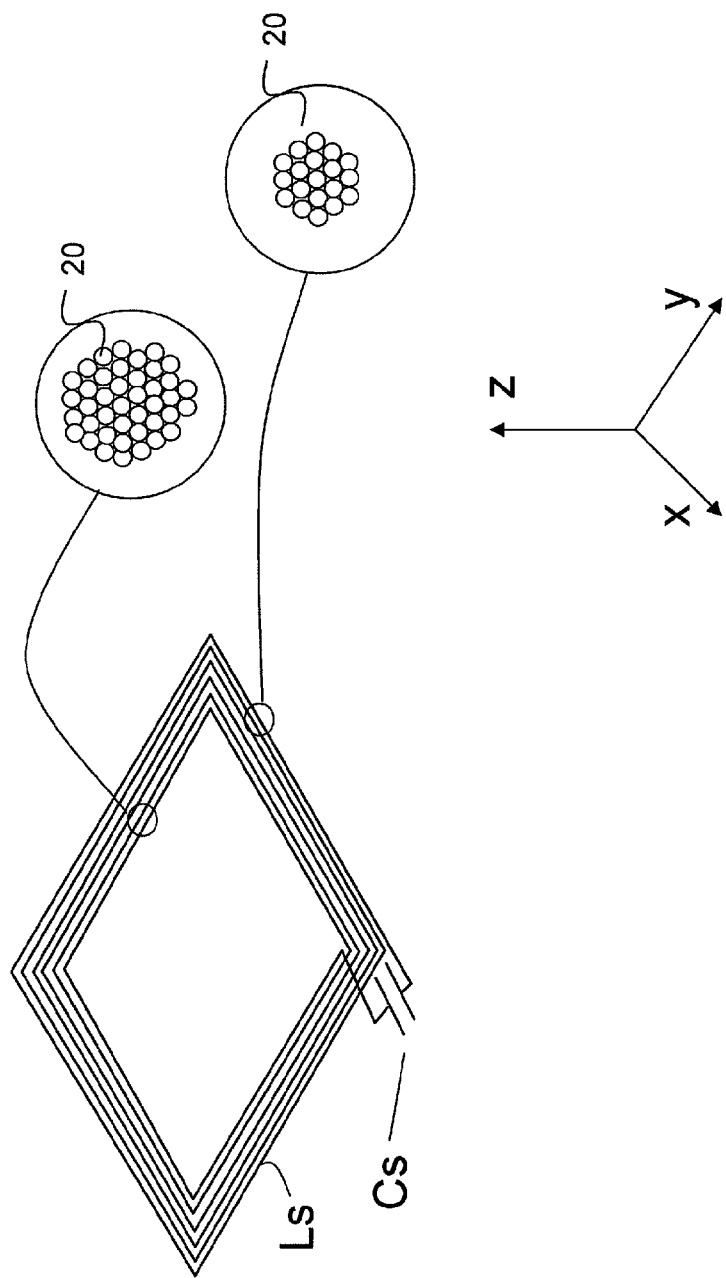
FIG. 6 is a schematic perspective view illustrating the smaller inductor according to the first preferred embodiment of the present invention.

FIG. 6 is a schematic representation illustrating the configuration of the smaller inductor Ls on a larger scale. In the example illustrated in FIG. 6, a low-resistance part is located in inner wires of the spiral wiring of the smaller inductor Ls, thereby improving the transmission efficiency more effectively while minimizing an increase in wiring length. In the inner part of the smaller inductor Ls, the surrounding magnetic field density is higher than in its outer part. That is why the eddy current produced by the conductor causes more loss in the inner part of the spiral than in the outer part thereof. Consequently, the more preferentially such influence is reduced, the more dramatically the efficiency will be improved in a power transmission system that has power-transmitting and power-receiving resonators with mutually different sizes. Also, a wasteful increase in overall wiring length can be avoided by lowering the resistance value of the smaller inductor Ls rather than by lowering that of the larger inductor LL. For these reasons, by adopting the arrangement of the present invention, the transmission efficiency can be further improved effectively while avoiding an increase in overall wiring length.

Impedance Matching Between Respective Blocks

Figure 7:
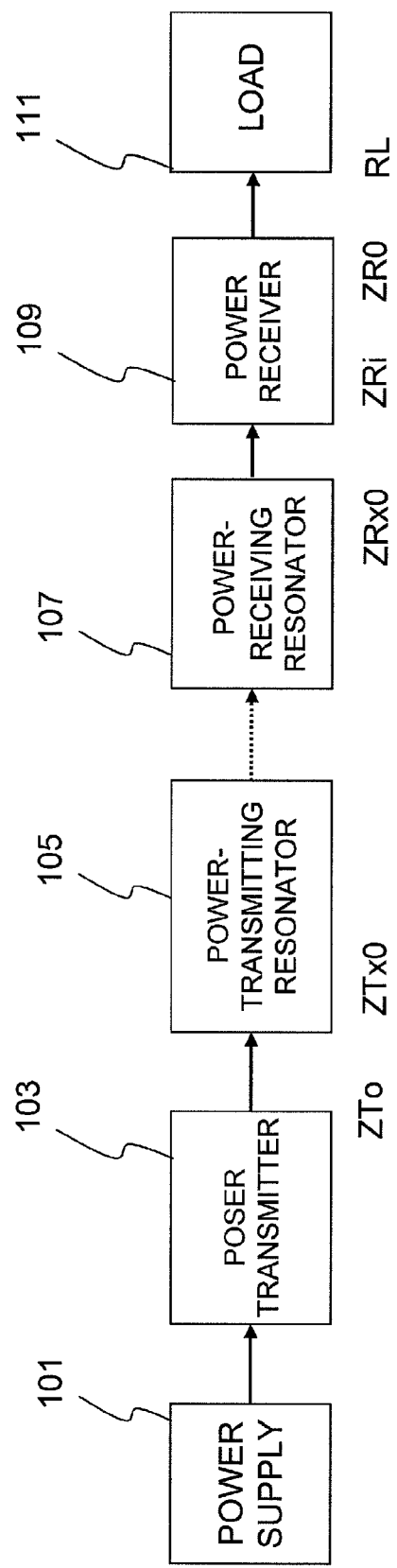
FIG. 7 is a block diagram illustrating a configuration for a wireless power transmission system according to the present invention.

FIG. 7 illustrates how to get impedance matching done in the wireless power transmission system of the present invention. It should be noted that functional blocks for performing a feedback control and other functional blocks are omitted from FIG. 7. Although not shown, blocks that realize those functions are added as needed.

Matching Condition #1: the system is designed so that the output impedance ZTo of the power transmitter 103 and the optimum input impedance ZTx0 of the power-transmitting resonator are matched to each other. If this condition is satisfied, reflection of the energy due to an impedance mismatch between the power transmitter 103 and the power-transmitting resonator 105 can be reduced.

Matching Condition #2: the system is designed so that the optimum output impedance ZRx0 of the power-receiving resonator 107 and the input impedance ZRi of the power receiver 109 are matched to each other. If this condition is satisfied, reflection of the energy due to an impedance mismatch between the power-receiving resonator 107 and the power receiver 109 can be reduced.

Matching condition #3: the system is designed so that the output impedance ZRo of the power receiver 109 that has operated with the input impedance ZRi is matched to the load impedance RL. If this condition is satisfied, reflection of the energy due to an impedance mismatch between the power receiver 109 and the load 11 can be reduced.

If all of these three Matching Conditions are satisfied at the same time, the transmission efficiency can be maximized. Note that these three Matching Conditions do not always have to be satisfied simultaneously.

Number of Power-Transmitting Resonator(s) and Number of Power-Receiving Resonator(s)

Neither the number of power-transmitting resonator(s) included in the transmission system nor that of power-receiving resonator(s) included there has to be one. The beneficial effect of the present invention will be achieved as long as the arrangement for reducing the resistance value described above is adopted for at least one pair of power-transmitting and power-receiving resonators with different sizes among multiple pairs of resonators for transmitting power in the group power-transmitting resonators and in the group of power-receiving resonators.

Specific Configurations of Circuit Elements

In the power-transmitting resonator and power-receiving resonator, the capacitors CL and Cs may be implemented as a chip capacitor, a ceramic capacitor, a tantalum electrolytic capacitor, an aluminum electrolytic capacitor, a mica capacitor, an electric double layer capacitor, a vacuum capacitor, and a lumped constant circuit element with an MIM structure formed by semiconductor device processing. Also, the capacitance value of each of these lumped constant circuit elements may be determined with the value of the parasitic capacitance distributed on the wiring taken into account.

The smaller inductor Ls and the larger inductor LL do not have to have a rectangular shape. Alternatively, these inductors may also have an elliptical shape or any other asymmetric shape. Still alternatively, the spiral shape may be replaced with a loop shape. If such a rectangular spiral shape is adopted, its corner portions preferably have a predetermined radius of curvature or more. This is because a wiring shape that does not have any portion of which the angle changes acutely can contribute to avoiding overconcentration of RF current or magnetic field density in the surrounding space, thus increasing the transmission efficiency quite a bit.

The wiring that forms these inductors does not always have to have a planar single-layer structure but may also have a multilayer structure as well.

It should be noted that as the resonators 105 and 107 have finite Q factors, the resonance phenomenon spreads on the frequency axis. That is why even if the resonant frequency of the resonators 105 and 107 does not exactly agree with the transmission frequency f0 of electromagnetic energy, power can also be transmitted. Also, if the resonant frequency of the resonators 105 and 107 has varied due to coupling between the resonators, power can still be transmitted as intended by changing either the transmission frequency accordingly or the terminal impedance of the transmission system. Furthermore, even if the resonators 105 and 107 have mutually different resonant frequencies due to some error caused during the manufacturing process, transmission can still be done in the vicinity of the resonant frequency.

Optionally, the resonators 105 and 107 may have variable functions. That is to say, the transmission system may also be designed so as to have its transmission impedance or resonant frequency changed by either switching or continuously varying the inductance and capacitance values of the inductor and capacitor that form each of those resonators.

EXAMPLES

To demonstrate the beneficial effects of the present invention, power-transmitting resonators and power-receiving resonators with the arrangement shown in FIG. 3 were fabricated. Specifically, specific examples of the present invention and comparative examples having the parameters shown in the following Table 1 were made in the following manner.

First of all, a square power-transmitting resonator and a square power-receiving resonator were provided as the larger inductor LL with a size of 20 cm square and as the smaller inductor Ls with a size of 5 cm square. That is to say, the power-transmitting and power-receiving resonators had an area ratio of sixteen to one. Each of these two inductors was formed as a spiral inductor with an adjacent wiring interval of 2 mm and a turn number of six. Two wires were extended from the inner and outer ends of each of these spirals. A power-transmitting capacitor (with a capacitance of 105 pF for the power-transmitting resonator) and a power-receiving capacitor (with a capacitance of 1920 pF), each of which was implemented as a multilayer chip capacitor, were connected in series to the spiral wirings, thereby forming resonators with a resonant frequency of 1.8 MHz. The resonators and an external input and output circuit were coupled together with an electromagnetic induction circuit.

As the inductor's wiring, a Litz wire, consisting of copper wires that had a diameter of 200 μm each and that were arranged in parallel with each other, was adopted, thereby reducing the conductor loss caused by the resonator. The wiring resistance per unit length of the spiral wiring varied with the number of parallel copper wires that formed the Litz wire. The number of parallel wires that formed each Litz wire in the spiral wiring path was set as shown in the following Table 1. In this manner, four different resonators T4, T5, T6 and T7 were provided as the power-transmitting resonators and four different resonators R4, R5, R6 and R7 were also provided as the power-receiving resonators. In the resonators T5 and R5, the inductor was a single wire with no low-resistance part anywhere. In the resonators T6 and R6, the inner three turns of the inductor was made up of 10 parallel wires, thereby reducing the resistance value in the inner third winding part at the resonant frequency. In the resonators T7 and R7, on the other hand, the outer three turns of the inductor was made up of 10 parallel wires, thereby reducing the resistance value in the outer three turns at the resonant frequency. And in the resonators T4 and R4, the entire inductor was made up of 10 parallel wires, thereby reducing the resistance value at the resonant frequency all over the wiring.

As can be seen from this description, the smaller resonators R6 and R7 on the power-receiving end had an inductor structure in which the resistance value Rs per unit length at the resonant frequency f0 was not constant but was lower in a part of the wiring path than in the other part thereof. On the other hand, the smaller resonator R4 on the power-receiving end had an inductor structure in which the resistance value Rs per unit length at the resonant frequency f0 had been reduced over the entire wiring path.

Eight different transmission systems were set up as Specific Examples #1, #2 and #3 of the present invention and as Comparative Examples #1, #2a, #2b, #2c and #3 by changing the combinations of the inductor for the power-transmitting resonator and the inductor for the power-receiving resonator as shown in the following Table 1. For instance, Comparative Example #1 was a system that used the inductor T5 as its power-transmitting resonator and the inductor R5 as its power-receiving resonator as shown in the following Table 1. The transmission characteristic between the resonators was measured on each of those systems shown in Table 1.

When the transmission characteristic was measured, the power-transmitting and power-receiving resonators were fixed so that their inductor planes were spaced apart from each other by 20 cm and were parallel to each other. The respective centers of mass of these inductors were fixed at coordinates x=y=0. Also, the input/output terminals of electromagnetic induction coils, which were arranged close to those inductors, were connected to a network analyzer to evaluate their pass/reflection characteristics with a small signal input. In this manner, the optimum impedance value that would maximize the transmission efficiency between the resonators and the maximum transmission efficiency were measured.

The following Table 1 shows the transmission characteristics of those specific examples of the present invention and comparative examples in comparison. Table 1 also shows the relative wiring lengths that those specific examples and comparative examples needed as respective ratios to the overall length of wiring used by Comparative Example #1 (in which no parallel wires were used anywhere in either inductor).

TABLE 1

| | Efficiency (%) | Reduced loss (%) | Resonator Power-transmitting (larger) | | Power-receiving (smaller) | | Ratio of overall wiring length to Cmp. Ex. 1 |
|---|---|---|---|---|---|---|---|
| Cmp. Ex. 1 | 88.6 | — | T5 | single wire with resistance reduced nowhere | R5 | Single wire with resistance reduced nowhere | |
| Ex. 1 | 91.1 | 22.1 | T5 | | R6 | 10 parallel wires with resistance reduced on inner 3 turns | 1.69 |
| Ex. 2 | 90.5 | 16.9 | T5 | | R7 | 10 parallel wires with resistance reduced on outer 3 turns | 1.93 |
| Ex. 3 | 93.0 | 38.8 | T5 | | R4 | 10 parallel wires with resistance reduced everywhere | 2.62 |
| Cmp. Ex. 2a | 88.9 | 2.6 | T6 | 10 parallel wires with resistance reduced on inner 3 turns | R5 | Single wire with resistance reduced nowhere | 4.53 |
| Cmp. Ex. 2b | 89.1 | 4.3 | T7 | 10 parallel wires with resistance reduced on outer 3 turns | R5 | | 4.84 |
| Cmp. Ex. 2c | 89.5 | 8.0 | T4 | 10 parallel wires with resistance reduced | R5 | | 8.38 |
| Cmp. Ex. 3 | 94.0 | 47.6 | T4 | | R4 | 10 parallel wires with | 10.00 |

TABLE 1-continued

| Efficiency (%) | Reduced loss (%) | Resonator Power-transmitting (larger) | Power-receiving (smaller) | Ratio of overall wiring length to Cmp. Ex. 1 |
|---|---|---|---|---|
| | | everywhere | resistance reduced everywhere | |

As shown in Table 1, the transmission efficiency that was 88.6% in Comparative Example #1 increased to 91.1%, 90.5% and 93.0% in Examples #1, #2 and #3, respectively, in which the wiring resistance had been reduced in at least part of the smaller inductor. That is to say, the loss could be reduced by 16.9% to 38.8% according to Examples #1 to #3. Also, this effect could still be achieved even though the overall wiring lengths used were 1.62 to 2.62 times as long as the wiring length used in Comparative Example #1.

On the other hand, in Comparative Examples #2a, #2b and #2c in which the wiring resistance was reduced in at least a part of the wiring path of the larger inductor, the loss could be cut down by just 2.6% to 8%, although the overall wiring lengths were 4.5 to 8.4 times as long as in Comparative Example #1.

Furthermore, in Comparative Example #3 in which the resistance was reduced in the entire wiring paths of the smaller and larger inductors, the loss could certainly be cut down by 47.6% with respect to Comparative Example #1 but the overall wiring length used also increased as much as tenfold. In contrast, according to Example #3 of the present invention, 81.5% of the loss that could be reduced by Comparative Example #3 could be cut down by using only 26% of the wiring length that was used by Comparative Example #3.

These results reveal that according to the present invention, the loss can be reduced efficiently with the overall wiring length used cut down significantly, which is an advantageous effect of the present invention.

Also, comparing the outcome of Example #1 (in which the loss could be reduced by 22.1%) to that of Example #2 (in which the loss could be reduced by 16.9%), the present inventors discovered that reduction in wiring resistance in the inner part of the wiring path of the smaller inductor produced more significant effects than reduction in wiring resistance in the outer part of the wiring path of the smaller inductor.

In each of the specific examples of the present invention described above, the larger inductor was formed as a single resistive wire. However, the present invention is in no way limited to those specific examples. Rather, the effect of the present invention could also be achieved even if the resistance value RL per unit length at the resonant frequency f0 was reduced in a part of the larger inductor. However, to avoid non-efficient increase in overall wiring length, it is still preferred that the larger inductor be a single resistive wire. Nevertheless, even if the resistance value RL was reduced in only a part of the larger inductor but if that part of the wiring path with the reduced resistance is sufficiently short, the increase in overall wiring length used is negligible.

The wireless power transmission system of the present invention is applicable to desktop and laptop computers and other kinds of office equipment and wall-mounted TV monitors, mobile AV devices and other kinds of audiovisual equipment. This wireless power transmission system can also be used to charge, and supply power to, not only hearing aids and healthcare equipment but also a running or parked car charging system for electric vehicles, electric motorcycles and mobile robots as well. The system of the present invention can find a wide variety of applications even in a system for collecting power from a solar cell or a fuel cell, a contact with a device in a DC power supplying system or a replacement for an AC outlet.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A wireless power transmission system for transmitting power by a non-contact method over a resonant magnetic field with a resonant frequency f0, the system comprising a power-transmitting resonator and a power-receiving resonator,
    wherein one of the power-transmitting and power-receiving resonators includes a first inductor, and the other resonator includes a second inductor, a size of the second inductor being smaller than a size of the first inductor, and
    wherein at the resonant frequency f0, at least a part of wiring that forms the second inductor has a resistance value Rs per unit length that is lower than the resistance value RL per unit length of wiring that forms the first inductor.

2. The wireless power transmission system of claim 1, wherein the wiring that forms the second inductor has a parallel wiring structure, and
    wherein at least part of the wiring that forms the second inductor has a greater number of parallel wires than the wiring that forms the first inductor.

3. The wireless power transmission system of claim 1, wherein the wirings that form the first and second inductors both have a parallel wiring structure, and
    wherein at least part of the wiring that forms the second inductor has a greater number of parallel wires than the wiring that forms the first inductor.

4. The wireless power transmission system of claim 1, wherein a part of the second inductor includes wires, of which at least one of the diameter, thickness and height is greater than their counterparts of the wiring that forms the first inductor.

5. The wireless power transmission system of claim 1, wherein except for an outermost part, the wiring that forms the second inductor has a lower resistance value Rs than the resistance value RL.

6. The wireless power transmission system of claim 5, wherein at least with respect to an innermost part, the wiring that forms the second inductor has a lower resistance value Rs than the resistance value RL.

7. The wireless power transmission system of claim 1, comprising a power transmitter for supplying power to the power-transmitting resonator,
 wherein the optimum input impedance of the power-transmitting resonator that maximizes transmission efficiency between the power-transmitting and power-receiving resonators is matched to the output impedance of the power transmitter.

8. The wireless power transmission system of claim 1, comprising a power receiver for receiving power from the power-receiving resonator,
 wherein the optimum output impedance of the power-receiving resonator that maximizes transmission efficiency between the power-transmitting and power-receiving resonators is matched to the input impedance of the power receiver.

9. The wireless power transmission system of claim 8, wherein the output impedance of the power receiver is matched to a load impedance.

10. A wireless power transmission system for transmitting power by a non-contact method over a resonant magnetic field with a resonant frequency f0, the system comprising a power-transmitting resonator and a power-receiving resonator,
 wherein one of the power-transmitting and power-receiving resonators includes a first inductor, and the other resonator includes a second inductor, a size of the second inductor being smaller than a size of the first inductor, and
 wherein at least a part of wiring of the second inductor that is inside a part of the second inductor has a lower resistance value per unit length than a resistance value per unit length outside the part of the second inductor.

11. The wireless power transmission system of claim 10, wherein at the resonant frequency f0, at least a part of wiring that forms the second inductor has a resistance value Rs per unit length that is lower than the resistance value RL per unit length of wiring that forms the first inductor.

* * * * *